United States Patent [19]
Pitcher

[11] Patent Number: 4,896,457
[45] Date of Patent: Jan. 30, 1990

[54] WATERING APPARATUS

[76] Inventor: Laurence S. Pitcher, 5160 Park Vista Blvd., Colorado Springs, Colo. 80918

[21] Appl. No.: 232,115

[22] Filed: Aug. 12, 1988

[51] Int. Cl.4 .............................................. A01G 25/00
[52] U.S. Cl. .......................................... 47/82; 222/54
[58] Field of Search ................. 47/79, 82, 83; 222/54, 222/477; 220/231

[56] References Cited

U.S. PATENT DOCUMENTS 3,438,575  4/1969  Rohling .............................. 47/79 X
4,121,734  10/1978  Soong .................................... 222/54

Primary Examiner—Robert A. Hafer
Assistant Examiner—Lynda M. Cofsky

[57] ABSTRACT

A measured and variable quantity of water is delivered to an object requiring periodic watering when a water filled vessel is inverted and mounted or suspended above the item requiring water. The vessels constricted orifice is sealed by a rubber stopper which has two holes into one of which is inserted a tube filled with water soluable material and the other of which contains a hollow vacuum breaking tube long enough to support the entire apparatus in reasonably giving material (sand, dirt, gravel, etc.). A tripod stand is also provided to suspend the device if such giving material is not present. As the soluable material is immersed in water by inverting the device the dissolution process begins and when all of the material in the tube has dissolved the contained water is set free through the dissolutime time tube. Timed control of 1 to 15 or more days is achieved by providing filled tubes of various lengths.

11 Claims, 2 Drawing Sheets

WATERING APPARATUS

BACKGROUND OF THE INVENTION (1) Field of the Invention

The present invention relates to devices that can be used to supply water to objects, such as growing plants, that might succumb to dehydration or be damaged when not supplied with water due to the absence of one who might otherwise directly administer water to such objects.

The watering apparatus is gravity fed, uses no moving parts, and requires no electrical, electronic, or mechanical parts to operate. It would relate to gravity fed irrigating devices, but only in so far as water flows from a higher to lower point to deliver water, and only to those devices that might be activated by timed dissolution of a specially treated non-toxic material employed to plug then release water when the said aforementioned material has, over a predetermined period of time, totally dissolved into the water.

(2) Description of Prior Art

The inventor, through development of his own origional concept, arrived at the herein presented and described watering apparatus. Subsequent investigation pursuant to patent application disclosed two existing patents on which the present embodiment touches but upon which it modifies, improves, and simplifies.

H. Rohling teaches of a very complex, root controlled, plant watering device in U.S. Pat. No. 3,438,575). The present invention by its simplicity alone greatly improves on Rohling's device also the present embodiment is capable of watering anything, animal, vegetable, or mineral since it does not rely on "soil moisture" to trigger its water release. Though a "vacuum breaking" principle is employed in Rohling's device the vacuum breaking tube in present invention is all in the open and could not be compromised by blockage, contamination, or compaction of soil around it.

Soong et al taught in their U.S. Pat. No. 4,121,734 of a device outwardly similar to the present embodiment, however different in several ways to wit:

The "spike" that might be used for placing the device in soil, being directly attached to and an integral part of the "reservoir" would limit the devices application to plants surrounded by "supporting" soil wherein the present embodiment using its stand could be used in any watering application and would in no way have such a limitation.

The amount of water released in the Soong device is limited to the amount held between its various levels whereas the present invention may be filled to any level up to the total capacity of the containment vessel and that amount will be released in a rush when desired.

Soong describes multiple levels to provide multiple watering "times" where the present embodiment uses filled tubes of varying lengths whereby the watering time can be more precisely controlled and the amount of water delivered more widely varied. Further, once the Soong device is filled with water the process begins wherein the present invention may be filled, set aside, then inverted and used at the pleasure of the administrator.

SUMMARY

A simple, effective, yet unique method of timed delivery of water to objects including plants, is herein described. A bottle like vessel with constricted neck is used as a reservoir to hold variable amounts of water that amount limited only by the size of the bottle.

The reservoir bottle is filled with water by the user in an amount deemed proper to satisfactorily saturate, fill, or dampen the object to be watered. A tube, filled with inert soluable material is then inserted into one of two holes in a flexible, compressable, rubber cork like stopper. The length of this tube, therefore the amount of material present, determines the amount of time before water release occurs. Into a second hole in the stopper is inserted a hollow tube to act both as a vacuum breaking mechanism and as a stand if the device is to be placed in giving dirt, sand, or soil. The stopper thus adorned is then placed in the constricted orifice of the bottle effecting a seal and now the device may be set aside for later use. To use the operator inverts the device, places it proximal to the object to be watered by gently driving the extended end of the tube into soil to hold it in an inverted mode or as an alternative a simple tripod stand is supplied and the inverted device is placed on the stand above or beside the object to be watered. The dissolving process begins only upon inversion when the water touches the dissolving tube, a distinct advantage over prior art. Upon complete dissolution of material in the tube the water is delivered to the object in a one time rush the outflowing water being replaced by in rushing air through the stand tube.

DETAILED DESCRIPTION OF THE INVENTION

The timed watering apparatus may be used to supply water to an otherwise unattended object or plant in a predetermined amount and during a predetermined time period with a specific plus-minus time variable of three hours, this over a total time period of 1 to 15 or more days. The watering apparatus will dispense a volume of water preselected by the user, once, in a rush during said preselected time period and is used in combination with other watering apparati two or more waterings could be accomplished during a given period at intervals selected by the user.

The device consists of five basic elements:

Figure 1:
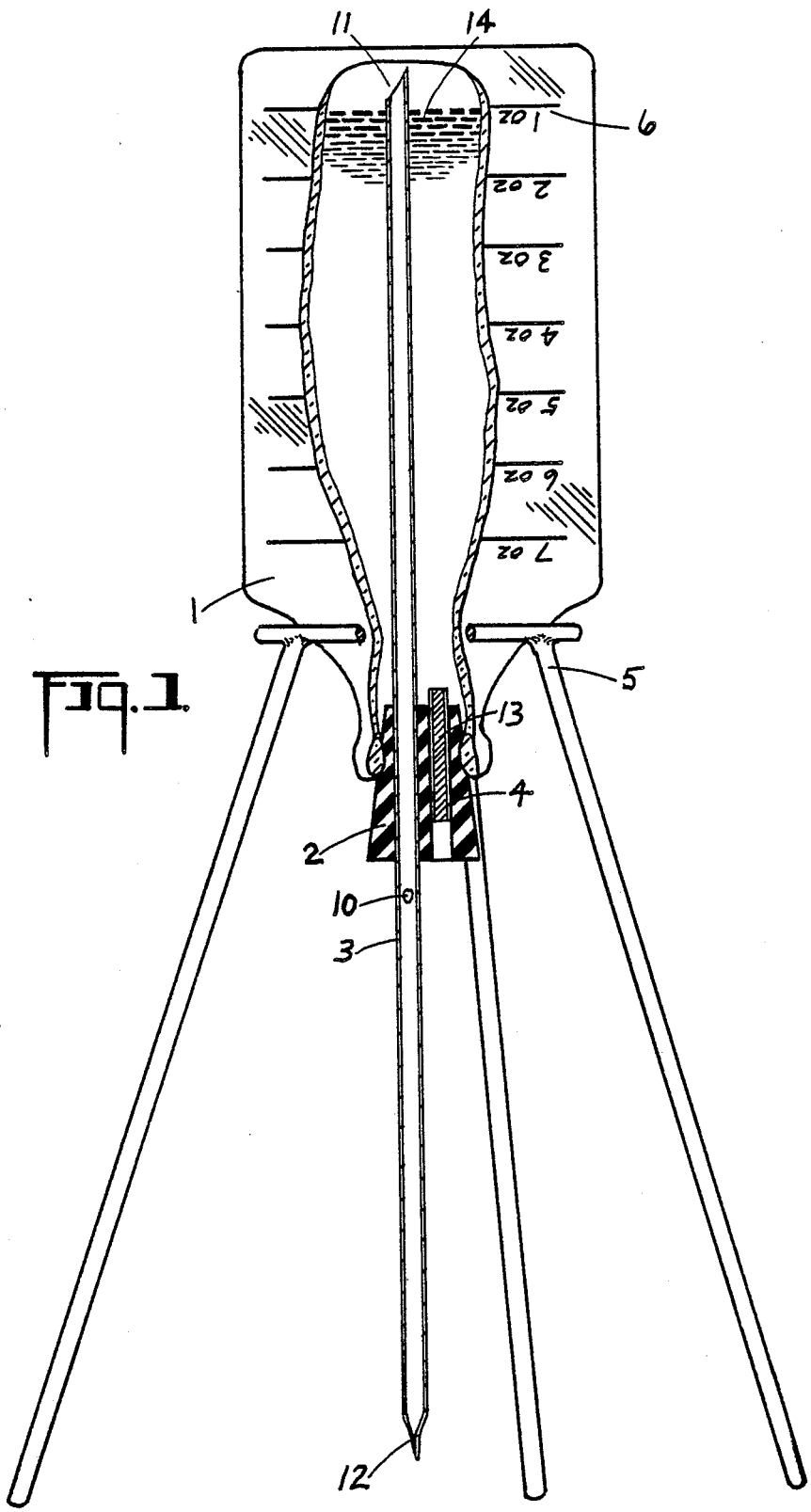
FIG. 1 is a side elevational view of a watering apparatus showing the component parts in relation to each other as typically assembled for automatically delivering a timed rush quantity of water.

The reservoir bottle (1) is constructed of glass or plastic and is graduated by surface marks (6) or a marked decal label (not shown) in one ounce increments. It has a constricted neck with orifice (7) which allows the rubber stopper (2) to fit and hermetically seal with ¼ to ½ penetration into the orifice (FIG. 1). In actual use several bottle sizes might be employed to service large or small water delivery needs.

The rubber stopper (2) is flat on both ends and with a conical tapered form. Two holes (8 and 9) travel the length of said stopper and maintain their uniform diameter throughout the length of said stopper. The holes penetrate the stopper parallel to a line through the long axis midline of the stopper. The stopper is variably sized to snugly fit the orifice of the reservoir bottle with a ¼ to ⅓ penetration and provide a hermetic seal (FIG. 1).

The vacuum breaking tube and stand (3) is so sized as to snugly fit in either hole (8 or 9) to produce a hermetic seal. The tube is made of metal or plastic, hollowed throughout, and bevelled (11) at one end. The other end (12) is pinched together in a spade-like manner. There is a hole (10) in the tube so placed to be not covered by the body of the stopper and to be within ½ inch of the outside air exposed surface of said stopper. The tube is variable in length as suits the size of reservoir bottle so that when in place the tip of the bevelled open end may touch the bottom of the bottle (FIG. 1) and the end outside vessel of sufficient length to allow adequate penetration and support if the device is used with soil, sand, or gravel.

The dissolution time tubes (4) are hollow throughout and made of metal or plastic. These tubes are variable in length from ⅜ inch to 1½ inches. The tubes are entirely filled with an inert-non-toxic material (13) that is solid within the tube filling and sealing it. The filler material is specifically chosen to dissolve at a given and uniform rate when immersed in water. The tube is so sized as to fit snugly in either hole (8 or 9) effecting a hermetic seal when so placed. By varying the length of the tube the dissolving time of the filling material is shortened or lengthened therefore the total time taken to dissolve all of the material in the tube and thereby release the water from the reservoir bottle may be controlled.

The tripod stand (5) is made of metal or plastic and is designed to hold the reservoir bottle above the object into which the water is to be released if it is not possible or practical to use the spade-like end of the vacuum breaking tube (3) to that purpose.

In practical operation the device is used in the following manner:

The vacuum breaking tube (3) is placed in either hole (8 or 9) with the bevelled end protruding through the small end of the stopper to a length such that it will be at or near the bottom of the reservoir bottle when the stopper is firmly placed into the bottle neck. Care is taken to insure that the small hole (10) is not covered by the stopper (2) (FIG. 1).

Figure 2:
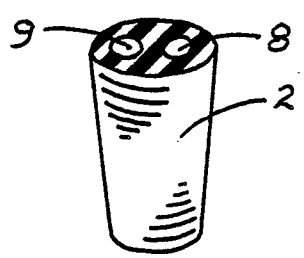
FIG. 2 shows each of the components of the watering apparatus.
Figure 5:
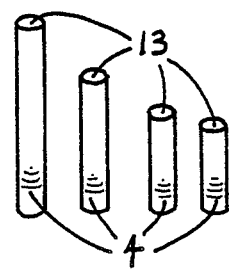
FIG. 5 is a side view of the means to allow a timed rush escape of water from the bottle shown in FIG. 3.
Figure 3:
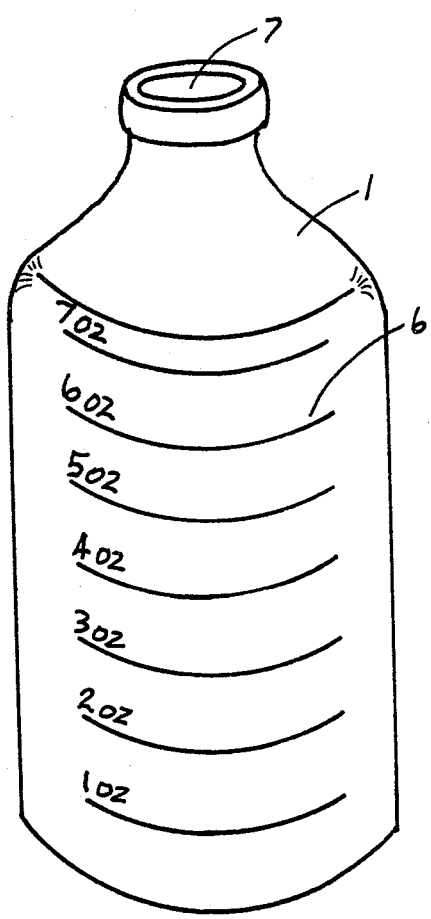
FIG. 3 is a side view of the reservoir bottle.
Figure 4:
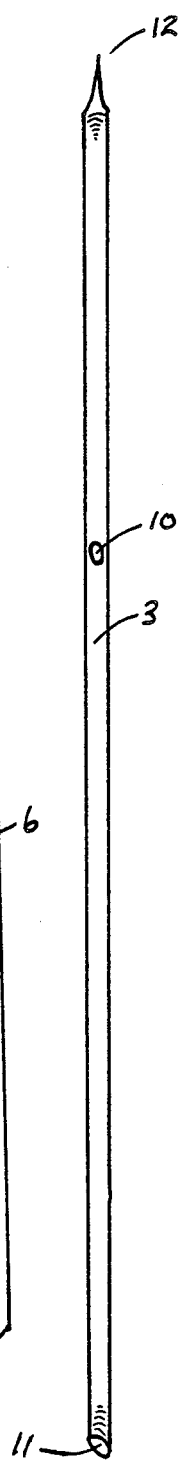
FIG. 4 is a side view of the vacuum breasking means.
Figure 6:
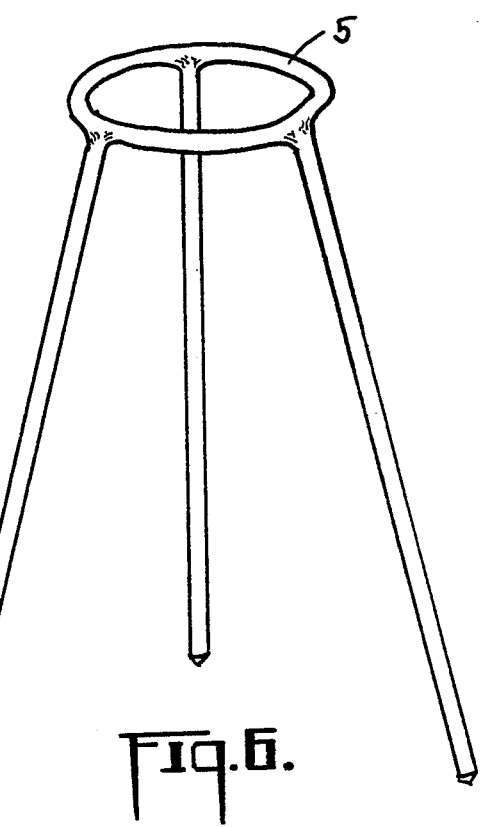
FIG. 6 is a side view of a support means to engage and hold the watering apparatus.

Next, one of the dissolution time tubes is placed in the remaining hole (8 or 9). Care is taken that the tube extends beyond the smaller stopper end (FIG. 1). This ensures that the dissolution time tube tip and its filler material is immersed in water and that no inadvertant air bubble may form over the dissolution time tube tip. The length of the tube selected determines the elapse of time desired before the water will be released. Tube lengths and therefore the dissolution times vary from 1 to 15 days. The reservoir bottle is then filled with the amount of water (14) the user wishes to release by filling to the appropriate 1 ounce mark. The stopper with the vacuum breaking tube and the timer tube in place is then firmly placed into the orifice of the reservoir bottle making sure the bevelled open end of said vacuum breaking tube is in the bottle (FIG. 1) and in such condition the watering apparatus may be set aside for an indefinite period prior to use. When employment of the apparatus is desired the reservoir bottle is then inverted and if a plant is to be watered, the spade-like end of the vacuum breaking tube is firmly inserted into the soil surrounding said plant thus securing said watering apparatus in an inverted position. Care is taken not to cover the small hole (10) in the tube (3) with the stopper or with dirt. If the object to which water is to be delivered is such that the spade-like end of the vacuum breaking tube cannot be inserted to support the watering apparatus firmly in an inverted position then the tripod stand (5) (FIGS. 1 and 2) may be used to this purpose. With said watering apparatus thus set up (FIG. 1) water is in constant contact with the dissolvable material in said dissolution time tube (4). Through Brownian molecular interaction said material will go into solution slowly from the wetted end down and progressively dissolve the substance in said tube. When said substance is all dissolved the water in said reservoir bottle will gravity flow through the now open dissolution time tube. Here the bevelled portion (11) of the vacuum breaking tube (3) comes into play. The tip of said tube is in the air pocket at the top of the inverted bottle and allows air to enter the hole (10), travel through said tube then into said reservoir bottle to replace the rapidly exiting water. Said reservoir bottle can now completely drain and supply water to whatever object is situated beneath it.

The watering apparatus may be used time and time again by simply removing the dissolving tube, placing another in its stead, and following the steps above.

I claim:

1. A watering apparatus for automatically delivering a timed rush quantity of water to a plant comprising:
    a continuous walled, cylindrical, inverted reservoir bottle narrowing to form a circumferential shoulder and an elongated neck having an orifice therethrough;
    a rubber stopper means of sufficient diameter to create a frictional, hermetic seal with the neck orifice comprising a circular rubber stopper having two through channels;
    a means to allow the timed rush escape of water from the bottle and contained within one of said channels;
    a vacuum breaking means extending through the second of said channels into the interior of the inserted reservoir bottle; and
    a support means to engage and hold the watering appartus proximal to and above a plant to be watered.

2. The watering apparatus of claim 1 wherein the bottle has indicia to indicate the volume of water contained within the bottle.

3. The watering apparatus of claim 2 wherein the channels in the rubber stopper are of constant and equal diameters of sufficient dimension to create a frictional and hermetic seal with the means to allow a timed rush escape of water and the vacuum breaking means.

4. The watering apparatus of claim 1 wherein the means to allow a timed rush escape to water comprises a dissolution time tube comprising a hollow, cylindrical body made of a water insoluble material which is filled with a water soluble material.

5. The watering apparatus of claim 4 wherein the dissolution time tubes have various lengths whereby the total time needed for the dissolution of the water soluble material contained within the dissolution time tube is determined by the various dissolution time tube lengths.

6. The water apparatus of claim 1 wherein the vacuum breaking means comprises.
    a hollow vacuum breaking tube having a pointed open end and a closed end; and a small aperture in the tube located at a distance from the pointed open end that is approximately equal to two-thirds of the total length of the tube.

7. The watering apparatus of claim 6 wherein the pinched, closed end is of a spade-like configuration whereby it may penetrate the soil in which a plant is growing.

8. The watering apparatus of claim 7 wherein the vacuum breaking tube is the support means to engage and hold the watering apparatus proximal to and above a plant to be watered.

9. The watering apparatus of claim 1 wherein the support means comprises a tripod-like structure that securely engages the circumferential shoulder of the inverted bottle.

10. The watering apparatus of claim 1 wherein the bottle is made of a glass material.

11. The watering apparatus of claim 1 wherein the bottle is made of a plastic material.

* * * * *